US009972110B2

(12) United States Patent
Steward (10) Patent No.: US 9,972,110 B2
(45) Date of Patent: May 15, 2018

(54) THERMOCLINE DISPLAY

(71) Applicant: Navico Holding AS, Egersund (NO)

(72) Inventor: Lucas Dale Steward, Broken Arrow, OK (US)

(73) Assignee: NAVICO HOLDING AS, Egersund (NO)

( * ) Notice: Subject to any disclaimer, the term of this patent is extended or adjusted under 35 U.S.C. 154(b) by 188 days.

(21) Appl. No.: 14/821,684

(22) Filed: Aug. 7, 2015

(65) Prior Publication Data
US 2017/0039744 A1    Feb. 9, 2017

(51) Int. Cl.
| | |
|---|---|
| *G06T 11/60* | (2006.01) |
| *G01S 15/89* | (2006.01) |
| *G06T 11/20* | (2006.01) |
| *G01S 7/62* | (2006.01) |
| *G01S 19/19* | (2010.01) |
| *G06F 3/14* | (2006.01) |

(52) U.S. Cl.
CPC ............ *G06T 11/60* (2013.01); *G01S 7/6218* (2013.01); *G01S 7/6272* (2013.01); *G01S 15/89* (2013.01); *G06T 11/206* (2013.01); *G01S 19/19* (2013.01); *G06F 3/14* (2013.01)

(58) Field of Classification Search
CPC . G01S 15/89; G01S 19/19; G06F 3/14; G06T 11/60; G06T 11/11206
See application file for complete search history.

(56) References Cited

U.S. PATENT DOCUMENTS

| | | | | |
|---|---|---|---|---|
| 5,581,930 A | * | 12/1996 | Langer .................. | A01K 79/02 43/17 |
| 5,834,641 A | * | 11/1998 | Sternal .................. | A01K 91/20 374/136 |
| 6,628,569 B1 | * | 9/2003 | Steiner .................. | G01S 15/96 367/111 |
| 2009/0187369 A1 | * | 7/2009 | Kang ..................... | G01J 5/00 702/130 |
| 2010/0199225 A1 | * | 8/2010 | Coleman ............... | G06F 3/038 715/858 |
| 2011/0013484 A1 | * | 1/2011 | Coleman ............... | G01S 15/87 367/88 |
| 2011/0054785 A1 | | 3/2011 | Wood et al. | |
| 2013/0077944 A1 | * | 3/2013 | Tugurlan ............... | F28F 27/00 392/441 |
| 2014/0009481 A1 | * | 1/2014 | Butterworth .......... | G06F 3/0484 345/581 |

(Continued)

OTHER PUBLICATIONS

Zhang et al., "Thermocline Tracking Based on Peak-Gradient Detection by an Autonomous Underwater Vehicle", OCEANS 2010, Sep. 20-23, 2010.*

(Continued)

*Primary Examiner* — Michelle L Sams
(74) *Attorney, Agent, or Firm* — Nelson Mullins Riley & Scarborough LLP (57) ABSTRACT

Various implementations described herein are directed to a device having a display and a computer configured to receive data from one or more sensors. The data may include positional data and thermocline data. The computer may be configured to display a first image associated with a chart map of a body of water that identifies areas having a thermocline layer based on the positional data and the thermocline data.

20 Claims, 8 Drawing Sheets

(56) References Cited

U.S. PATENT DOCUMENTS

2014/0013276 A1* 1/2014 Butterworth ........ G06F 3/04886
　　　　　　　　　　　　　　　　　　　　　　　715/821
2017/0012713 A1　　1/2017 Sumption

OTHER PUBLICATIONS

"Humminbird 500 series Manual", Johnson Outdoors Marine Electronics, Inc., 2012, p. 1-8, 20-37, 52-58, 156-153.*
https://web.archive.org/web/20110204193513/http://www.jasonhalfenoutdoors.com/Thermocline.html, Feb. 4, 2011.*
"Thermocline", https://we.archive.org/web20130304140734/http://ww2010.atmos.uluc.edu/(Gh)/wwhlpr/thermocline.rxml, Mar. 4, 2013.*
GRIB Explorer for Mac User Guide, retrieved Oct. 2, 2017 from <http://downloads.ocens.com/downloads/documents/ocens/GRIB%20Explorer%20for%20Mac%20Manual.pdf>.

* cited by examiner

THERMOCLINE DISPLAY

BACKGROUND

This section is intended to provide information to facilitate an understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

When trolling, sonar may assist an angler with locating fish. In some situations, knowing thermal conditions of a column of water may also be helpful. Unfortunately, when attempting to determine thermal conditions, an angler may spend significant time trolling back and forth and searching for possible thermal variations in the water column before blindly setting their lure depth.

SUMMARY

Described herein are implementations of technologies for a device having a display and a computer configured to receive data from one or more sensors. The data may include positional data and thermocline data. The computer may be configured to display a first image associated with a chart map of a body of water that identifies areas having a thermocline layer based on the positional data and the thermocline data.

Described herein are also implementations of technologies for a multi-function marine based apparatus having a display, a processor, and memory with instructions that cause the processor to receive data from one or more sensors. The data may include positional data, sonar data, and thermocline data. On a first portion of the display, the instructions may cause the processor to display a first image associated with a chart map of a body of water that identifies areas having a thermocline layer based on the positional data and the thermocline data. On a second portion of the display that is different than the first portion of the display, the instructions may cause the processor to display a second image associated with the sonar data that identifies underwater features below a surface of the body of water along with identifying a vertical depth of the thermocline layer based on the thermocline data.

Described herein are implementations of various technologies for a method including receiving data from one or more sensors. The data may include positional data, sonar data, and thermocline data. On a first portion of a marine electronics device, the method may include displaying a first image associated with a chart map of a body of water that identifies areas having a thermocline layer based on the positional data and the thermocline data. On a second portion of the marine electronics device that is different than the first portion of the marine electronics device, the method may include displaying a second image associated with the sonar data that identifies underwater features below a surface of the body of water along with identifying a vertical depth of the thermocline layer based on the thermocline data.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques are described herein with reference to the accompanying drawings. It should be understood, however, that the accompanying drawings illustrate only the various implementations described herein and are not meant to limit the scope of various techniques described herein.

DETAILED DESCRIPTION

Various implementations described herein are directed to various techniques for displaying thermocline data on a marine based display. These techniques may include receiving data from one or more sensors, wherein the data may include positional data, sonar data, and thermocline data. On a first portion of the display, these techniques may display a first image associated with chart data (e.g., a chart map) associated with a body of water (e.g., a lake) that identifies areas having a thermocline layer based on the positional data and the thermocline data. On a second portion of the display that is different than the first portion, these techniques may display a second image associated with the sonar data that identifies underwater features below a surface of the body of water along with the vertical depth of the thermocline layer based on the thermocline data. These techniques and various other details associated therewith are described in greater detail herein below.

Various implementations of displaying thermocline data will now be described in reference to FIGS. 1-7.

Figure 1:
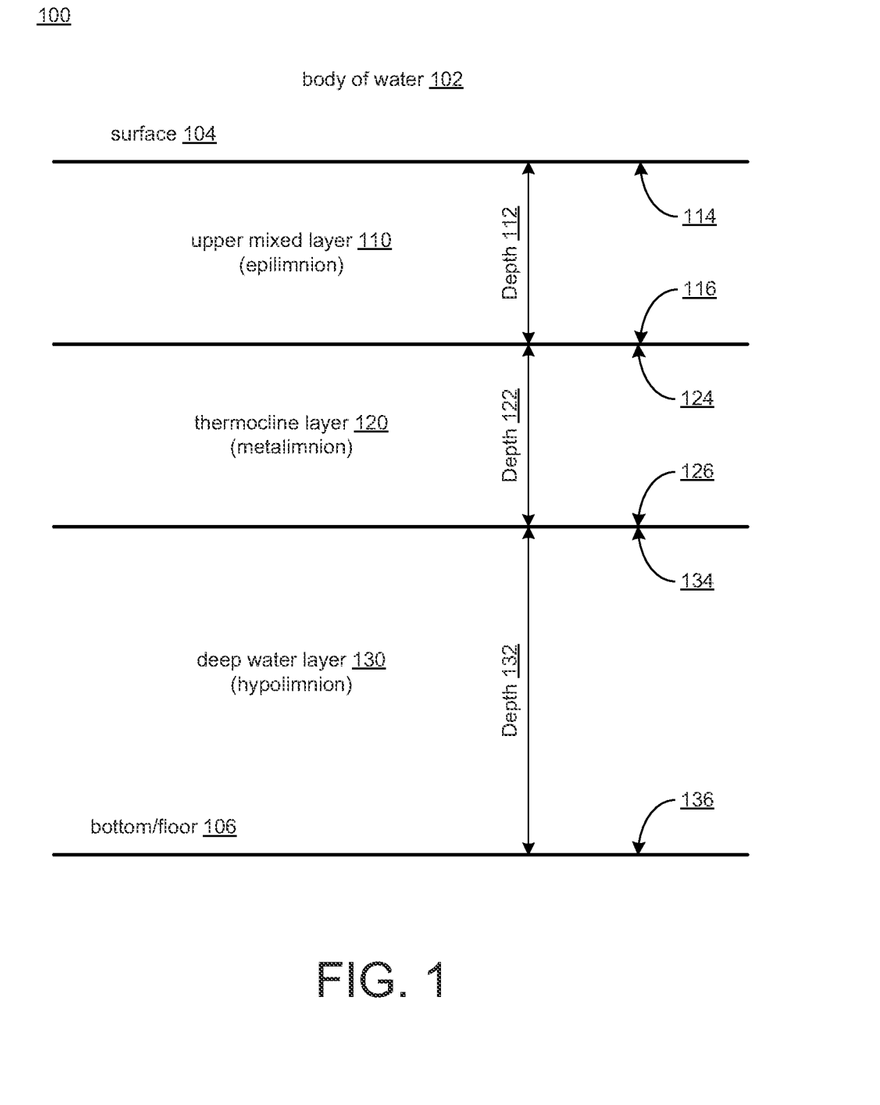
FIGS. 1-3 illustrate thermal characteristics associated with a body of water in accordance with various implementations described herein.
Figure 2:
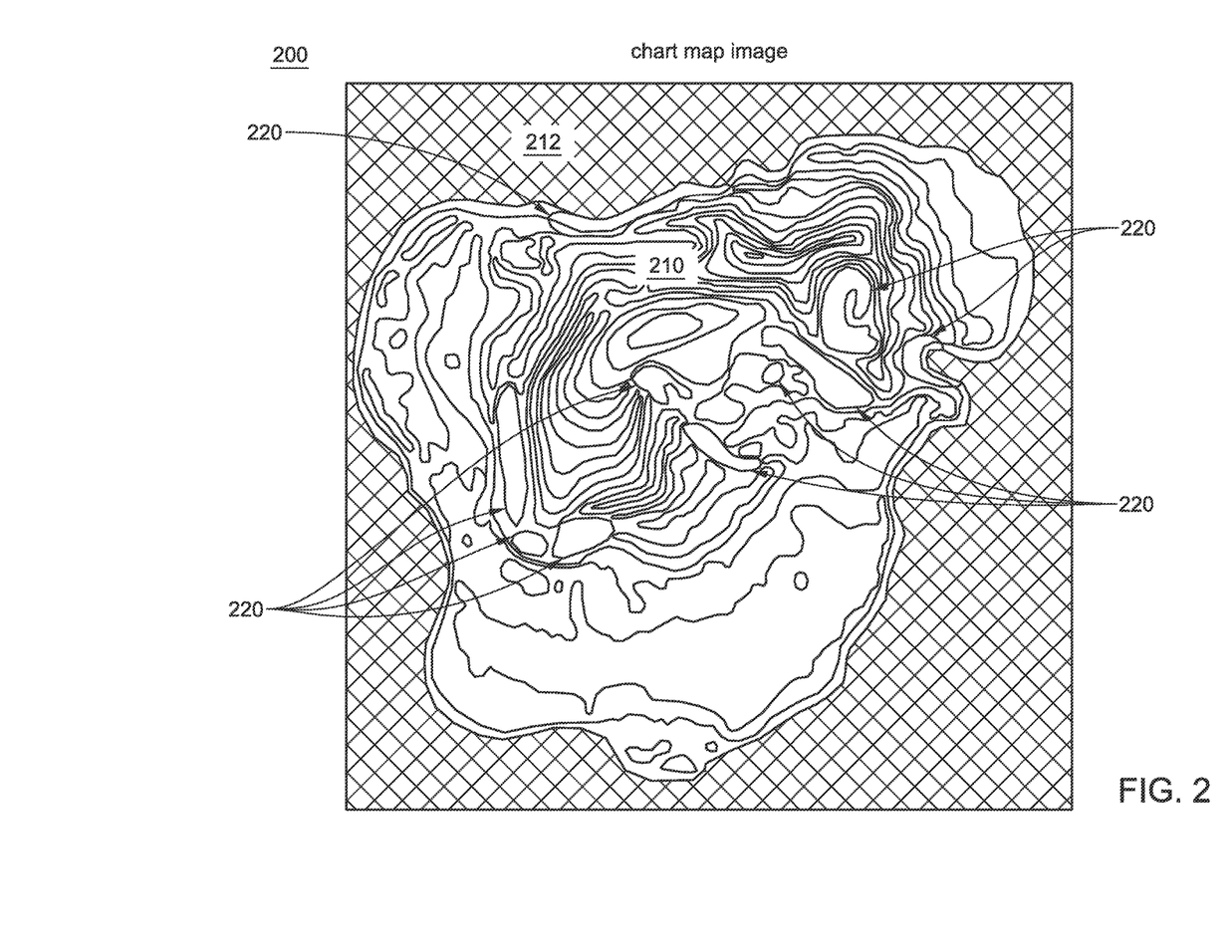
Figure 3:
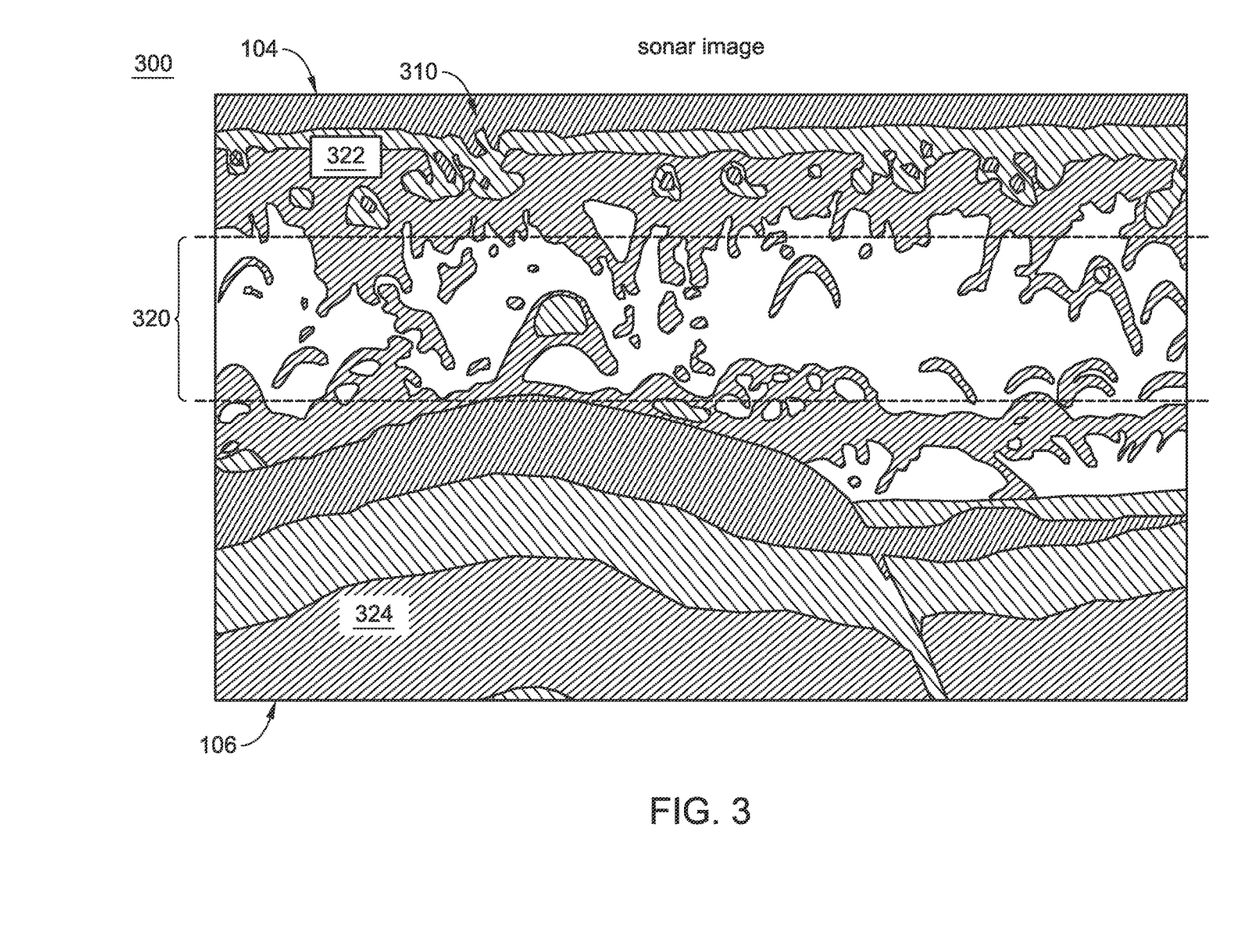

FIGS. 1-3 illustrate thermal characteristics associated with a body of water 102 in accordance with various implementations described herein. In particular, FIG. 1 illustrates various thermal layers 100 of the body of water 102, FIG. 2 illustrates a chart map image 200 (e.g., a top view) of the body of water 102, and FIG. 3 illustrates a sonar image 300 of the body of water 102 (e.g., a side view of a water column).

In reference to FIG. 1, the body of water 102 may include any type of water body, such as, e.g., an ocean, a lake, a stream, a pond, etc. Generally, the body of water 102 includes a surface 104 and a bottom or floor 106 with a column of water disposed therebetween. In some situations, this water column may include various thermal layers at various depths in the water column.

At a first depth 112 having upper and lower boundaries 114, 116, respectively, a first layer 110 may include an upper mixed layer (or region), which may be referred to as the epilimnion. The epilimnion may refer to a top-most layer in a thermally stratified lake. Due to close proximity to the surface 104, the epilimnion layer may receive substantial exposure to sunlight, and as such, the epilimnion layer may be a warmer layer than other lower layers in the thermally stratified lake. Further, the epilimnion layer may have a higher pH and a higher dissolved oxygen ($O_2$) concentration than the lower layers. Sometimes, at the surface 104, the epilimnion layer may exhibit turbulence due to surface wind-mixing. As such, at the surface 104, due in part to wind-mixing effects, the epilimnion layer may be free to exchange dissolved gases, such as, e.g., oxygen ($O_2$) and carbon-dioxide ($CO_2$) with the atmosphere.

At a second depth 122 having upper and lower boundaries 124,126, respectively, a second layer 120 may include a thermocline layer (or region), which may be referred to as the metalimnion. In some instances, the metalimnion may refer to a middle or intermediate layer in a thermally stratified lake. The thermocline layer refers to a distinct layer in a large body of water in which temperature may change rapidly with depth as opposed to other layers above or below. The thermocline layer may refer to or describe a thermal characteristic (or condition or feature) of a body of water in which thermocline occurs. Some factors that may affect depth and thickness (or vertical height) of the thermocline layer may include seasonal weather variations, geographic latitude, surface water heating and cooling, turbulence brought on by surface wind-mixing, and/or environmental conditions, such as water flow currents.

At a third depth 132 having upper and lower boundaries 134, 136, respectively, a third layer 130 may include a deep water layer (or region), which may be referred to as the hypolimnion. In some instances, the hypolimnion may refer to a dense, bottom layer of water in a thermally-stratified lake, and the hypolimnion layer may lie below the thermocline layer. The hypolimnion layer may be considered the coldest layer of a lake in summer seasons and the warmest layer during winter seasons. Due to its close proximity to the bottom or floor 106, the hypolimnion is somewhat isolated from surface wind-mixing and receives insufficient exposure to sunlight. In some instances, the hypolimnion layer may be warmer in lakes at warmer geographic latitudes.

Generally, during trolling, anglers search for fish in relation to the depth of the thermocline layer. In some situations, some bodies of water may have a thermocline layer at a same or approximately similar depth, and thus, an upper boundary of the thermocline layer may be identified with a lower boundary being the bottom or floor. In other situations, some bodies of water may not have or may not show evidence of a thermocline layer, and therefore, the thermocline layer may not be identified.

In reference to FIG. 2, the body of water 102 of FIG. 1 may be charted, and the chart map image 200 may be generated based on chart data (i.e., chart mapping data) derived or obtained from geo-positioning data, such as, e.g., global positioning data (GPS data). In some instances, the chart map 200 may be referred to as a schematic depiction or diagram designating surface features of Earth based regions, such as land and water based geographic objects, features, and regions. As shown in FIG. 2, the chart map image 200 may be viewed as a static two-dimensional representation of the body of water 102, as depicted from a position above the body of water 102.

As shown in FIG. 2, the chart map image 200 provides shading and highlighting to depict various contours and shapes of geographic objects, features, and regions. For instance, the chart map image 200 shows an identifiable water body image 210, such as, e.g., a lake, having lighter shading, surrounded by a land mass 212, having darker shading. In this instance, the contour of the water body is identifiable by an edge or demarcation line showing a separation between water and land. Further, within the boundaries of the water body image 210, highlighted areas of thermocline instances 220 are shown, so as to identify areas of thermocline in the water column. In this instance, these areas 220 provide a schematic view of the water body image 210 with a thermocline overlay that assists with identifying areas of thermocline in the water body.

In some implementations, highlighting may include use of coloring, e.g., using various different colors and/or using various color overlay options. In some other implementations, highlighting may include use of shading, e.g., using cross-hatching or various different grey-scale shading and/or blending and/or various grey-scale overlay options. Various other known highlighting techniques may also be used.

As shown in FIG. 3, the sonar image 300 may provide shading and highlighting to depict various contours and shapes of thermal layers or regions in the water column of the body of water 102 between a surface 104 and a bottom or floor 106. The sonar image 300 shows a side profile view of an identifiable water column 310 (e.g., of the lake in FIG. 2) having a lighter shading that depicts a thermocline layer 320 surrounded by an upper mixed layer 322, having a darker shading, and a lower deep water layer 324, also having darker shading. In this instance, the contour of the thermocline layer 320 is identifiable by an edge or demarcation area showing a separation between thermal layers. Further, within the boundaries of the water column 310, highlighted areas of the thermocline layer 320 are shown, so as to identify areas of thermocline in the water column 310. In this instance, these areas 320 provide a schematic view of the water column 310 with a thermocline overlay that may assist with identifying areas of thermocline in the water column 310.

Figure 4:
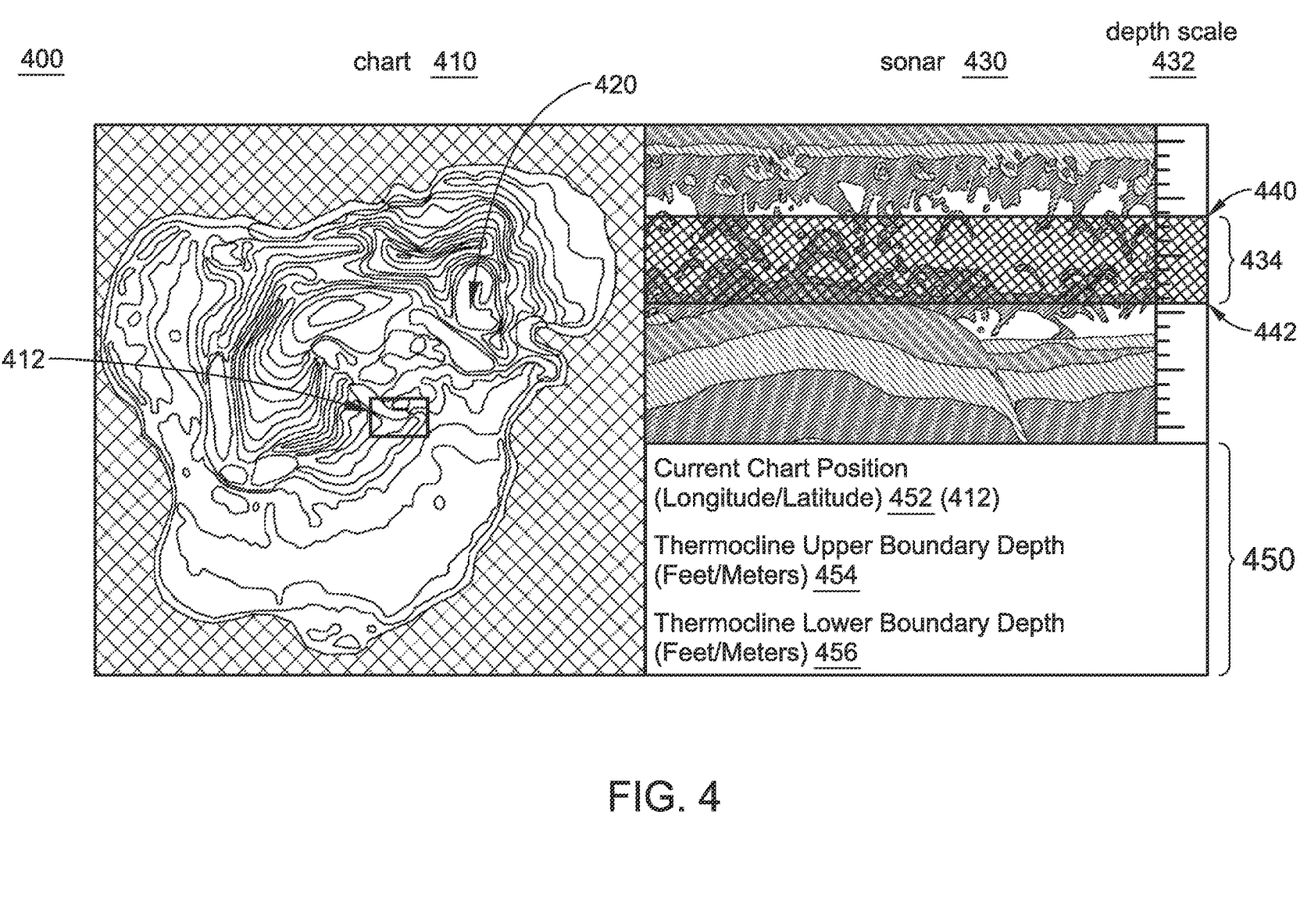
FIG. 4 illustrates a multi-display of thermal characteristics associated with the body of water in accordance with various implementations described herein.

FIG. 4 illustrates a multi-display of thermal characteristics associated with the body of water 102 in accordance with various implementations described herein.

Figure 6:
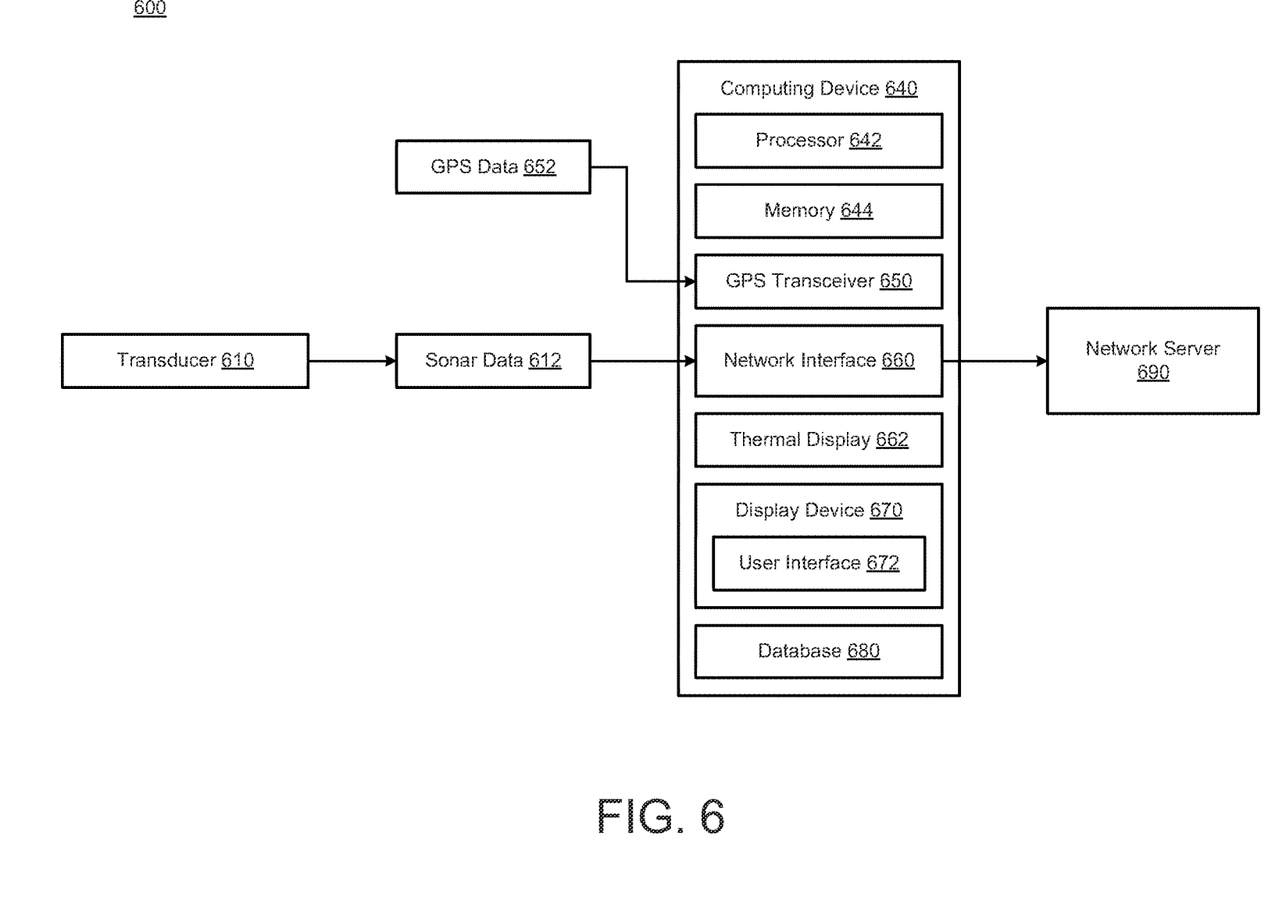
FIG. 6 illustrates a diagram of thermal display system in accordance with various implementations described herein.

In various implementations, techniques for displaying thermocline data may be performed or executed by various types of computing devices, such as, e.g., a computing device 640 as shown and described in reference to FIG. 6. Further, these techniques may be used in conjunction with a multi-function display (MFD), such as, e.g., a marine display or marine electronics device 700 as described in reference to FIG. 7.

For instance, the techniques described herein include receiving various marine electronics data from one or more sensors, such as, e.g., a sonar transducer a global positioning transceiver, etc. The marine electronics data may include various types of data, including positional data, sonar data, and/or thermocline data.

As shown in reference to FIG. 4, one or more marine based images may be displayed on a display. For instance, a first image 410 may be displayed on a first portion (e.g., left side) of a display. As shown, the first image 410 may be associated with chart data and may include a chart map of the body of water 102 (e.g., as described in reference to FIG. 2) that identifies areas having a thermocline layer 420 based on the positional data and the thermocline data. Further, a second image 430 may be displayed on a second portion (e.g., right side) of a display. As shown, the second image 430 may be associated with the sonar data that identifies underwater features below the surface 104 of the body of water 102 (e.g., as described in reference to FIG. 3) along with identifying a vertical depth of the thermocline layer 434 based on the thermocline data. The vertical depth of the thermocline layer 434 may be indicated or displayed as part of a vertical depth scale 432, wherein the approximate depth of thermocline layer 434 may be shaded, and approximate upper and lower boundaries 440, 442, respectively, may be identified on the vertical depth scale 432.

In some instances, a third image 450 may be displayed on a display, wherein the third image 450 may indicate, provide, or display data and information related to a current chart position 452, including longitude and latitude of a position as indicated with a window 412 in the chart map 410. Further, in some instances, the third image 450 may indicate, provide, or display data and information related to a thermocline upper boundary depth 454 (e.g., in feet and/or meters) of the approximate upper boundary 440 as shown or displayed in the vertical depth scale 432. Further, the third image 450 may indicate, provide, or display data and information related to a thermocline lower boundary depth 456 (e.g., in feet and/or meters) of the approximate lower boundary 442 as shown or displayed in the vertical depth scale 432.

Figure 5A:
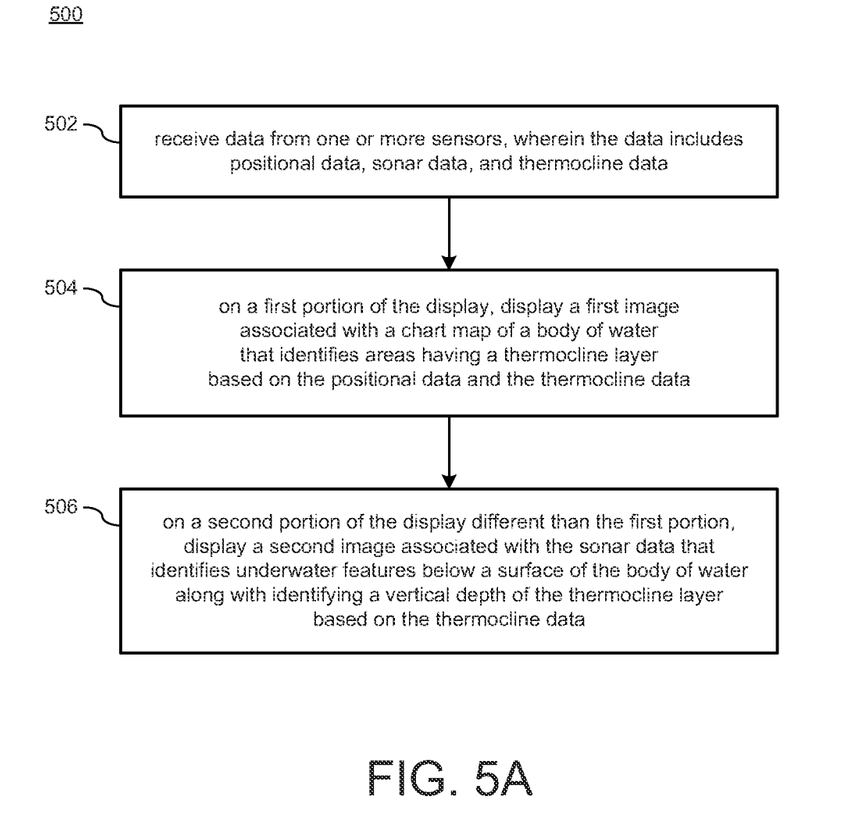
FIGS. 5A-5B illustrate process flows of various methods for displaying thermal characteristics in accordance with various implementations described herein.
Figure 5B:
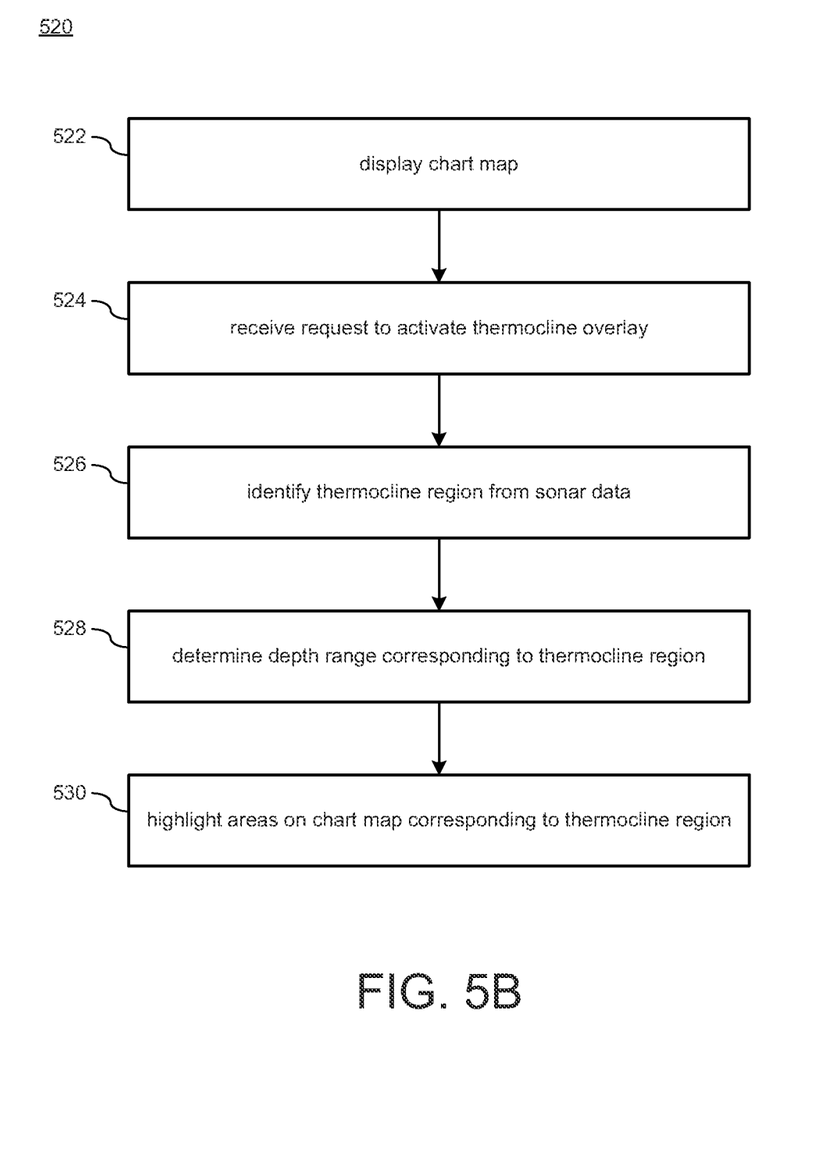

FIGS. 5A-5B illustrate process flows of various methods for displaying thermal characteristics in accordance with various implementations described herein.

In particular, FIG. 5A illustrates a process flow diagram for a method 500 of displaying thermocline data in accordance with implementations of various techniques described herein. It should be understood that while method 500 indicates a particular order of execution of operations, in some instances, certain portions of the operations may be executed in a different order, and on different systems. Further, in some other instances, additional operations or steps may be added to method 500. Similarly, some operations or steps may be omitted.

Method 500 may be performed or executed by various types of computing devices, such as, e.g., the computing device 640 as shown and described in reference to FIG. 6. As described herein, the computing device 640 may be configured to interface with one or more sonar transducers, receive sonar data and thermocline data, and display various images associated therewith, including one or more images associated with sonar data and thermocline data. The computing device 640 may configured to interface with a GPS receiver (or transceiver), receive positional data (e.g., GPS data), and display one or more images associated therewith, including images associated with chart data (e.g., a chart data map) and positional data. Further, in some implementations, the techniques of method 500 may be used in conjunction with a multi-function display (MFD), such as, e.g., the marine display or the marine electronics device 700 as shown and described in reference to FIG. 7.

At block 502, method 500 may receive data from one or more sensors, wherein the data may include positional data, sonar data, and/or thermocline data. As described herein, a computing device may be implemented as a MFD that is configured to interface with the one or more sensors and receive the data from one or more sensors.

At block 504, on a first portion of a display, method 500 may display a first image associated with a chart map of a body of water that identifies areas having a thermocline layer based on the positional data and the thermocline data. The computing device may be configured to automatically identify areas of the body of water having the thermocline layer based on the positional and thermocline data and automatically display the first image on the display based on the positional and thermocline data. The first image may identify a current position on the body of water based on the positional data along with identifying areas of the body of water having the thermocline layer. The one or more sensors may include a GPS sensor, and the positional data may include GPS data received from the GPS sensor.

At block 506, on a second portion of the display that is different than the first portion, method 500 may display a second image associated with the sonar data that identifies underwater features below a surface of the body of water along with identifying a vertical depth of the thermocline layer based on the thermocline data. A computing device may be configured to automatically identify underwater features below a surface of the body of water based on the sonar data, automatically identify the vertical depth of the thermocline layer based on the thermocline data, and automatically display the second image on the display based on the sonar data and the thermocline data. The one or more sensors may include one or more sonar sensors, and the sonar data may include sonar scanning data received from the one or more sonar sensors. Further, the one or more sonar sensors may be configured to detect the thermocline layer in the body of water, and therefore, the sonar data may include the thermocline data received from the one or more sonar sensors. The one or more sonar sensors may include multiple transducer elements having one or more of a right scanning transducer, a left scanning transducer, a down scanning transducer, and a conical down beam transducer.

In some instances, a computing device may be configured to simultaneously display the first and second images on a split screen of a display. Further, the second image may be a sonar image having a shaded region that overlays a portion of the sonar image identified as the thermocline layer. The second image may include a sonar image having a vertical depth scale displayed along with the sonar image, and the vertical depth scale may provide information related to a depth of the thermocline layer. In some instances, the information related to the depth of the thermocline layer may include an indication for an upper boundary depth of the thermocline layer and another indication for a lower boundary depth of the thermocline layer.

FIG. 5B illustrates another process flow diagram for a method 520 of displaying thermocline data in accordance with implementations of various techniques described herein. It should be understood that while method 520 indicates a particular order of execution of operations, in some instances, certain portions of the operations may be executed in a different order, and on different systems. In some other instances, additional operations or steps may be added to method 520. Similarly, some operations or steps may be omitted. As with method 500 of FIG. 5A, method 550 of FIG. 5B may be performed or executed by various types of computing devices, such as, e.g., the computing device 640 as shown and described in reference to FIG. 6. Further, in some implementations, the techniques of method 500 may be used in conjunction with a multi-function display (MFD), such as, e.g., the marine display or the marine electronics device 700 as shown and described in reference to FIG. 7.

At block 522, method 520 may display a chart map associated with a body of water. For instance, as shown in reference to FIGS. 2 and 4, the chart map image 200, 410 may be associated with the body of water 210, such as, e.g., a lake, surrounded by a land mass 212. In some implementations, as shown in reference to FIG. 4, the chart map 410 may be displayed on a left-hand side of a display.

At block 524, method 520 may receive a request to activate (e.g., turn on) a thermocline overlay associated with the chart map. For instance, as shown in reference to FIG.

Figure 7:
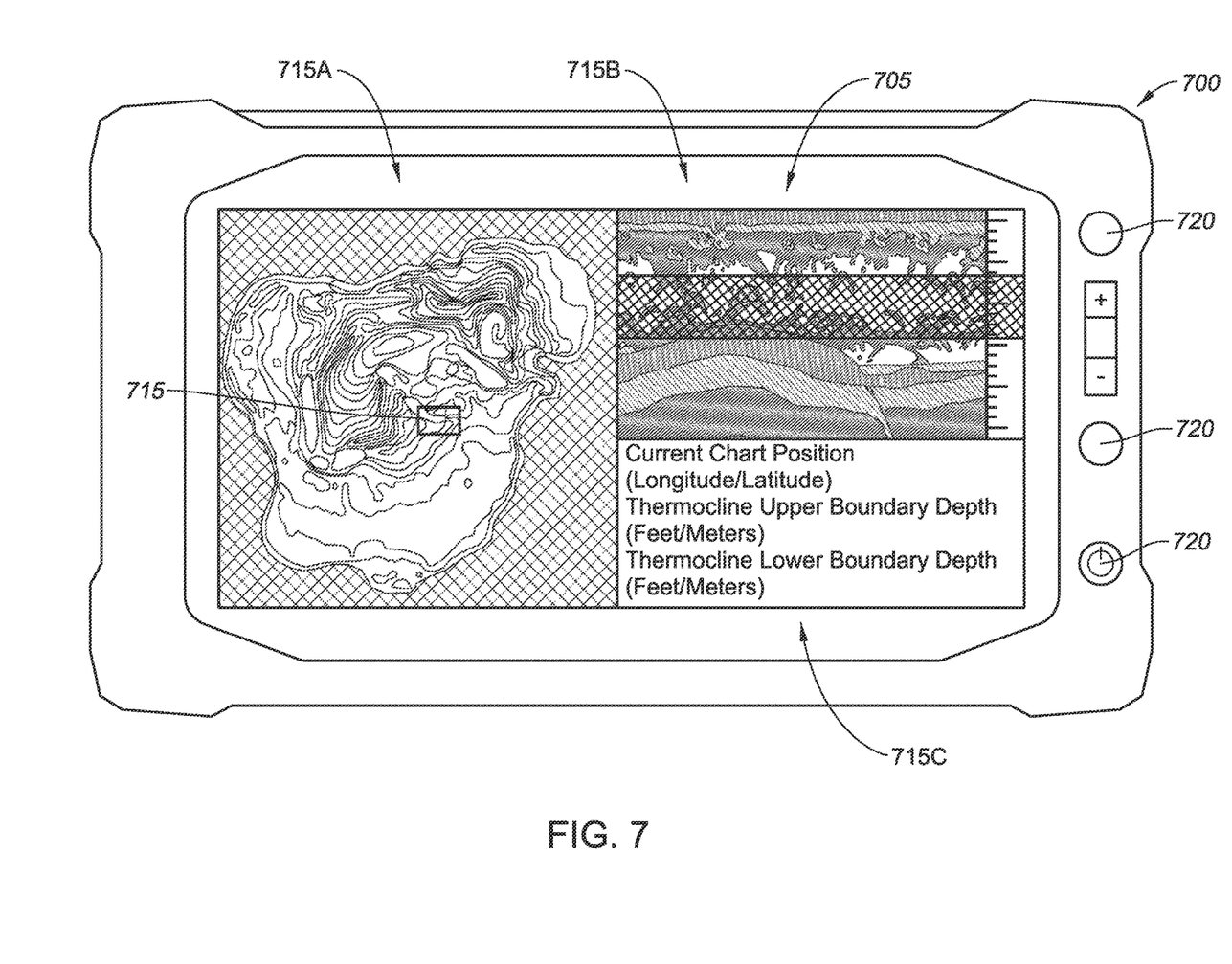
FIG. 7 illustrates a schematic of a marine electronics device in accordance with various implementations described herein.

7, the marine display or marine electronics device 700 may include one or more buttons 720, wherein at least one of the buttons 720 may be configured to activate or turn on the thermocline overlay upon selection by a user (e.g., an angler).

At block 526, method 520 may identify a thermocline region associated with the body of water from sonar data received from one or more sonar transducers. For instance, as shown in reference to FIGS. 3 and 4, the sonar image 300, 430 may be associated with the column of water 310, such as, e.g., a column of water in a lake, as depicted, e.g., in the chart map image 200, 410. In some implementations, as shown in reference to FIG. 4, the sonar image 430 may be displayed on a right-hand side of a display along with the chart map image 410 displayed on the left-hand side.

At block 528, method 520 may determine a depth range corresponding to the thermocline region associated with the body of water as identified from the sonar data. For instance, as shown in reference to FIGS. 3 and 4, the sonar image 300, 430 may be associated with the column of water 310, and a vertical depth range or scale 432 of the thermocline layer 434 may be displayed with a shaded area or region along with the sonar image 300, 430. In some implementations, as shown in reference to FIG. 4, the thermocline layer 434 may be implemented as an overlay (as shown with shading) on the sonar image 430, and the thermocline layer overlay 434 may correspond to the vertical depth scale 432. In this instance, the shading may further overlay the vertical depth scale 432 to show an approximate depth of the thermocline layer 434 along with approximate upper and lower boundaries 440, 442, respectively, of the thermocline layer 434.

At block 530, method 520 may highlight areas on the chart map associated with the body of water corresponding to the thermocline region. For instance, as shown in reference to FIGS. 2 and 4, the chart map image 200, 410 may include highlighted areas or regions 420 showing parts of the body of water having a thermocline layer. Further, in another instance, as shown in reference to FIGS. 3 and 4, the sonar image 300, 430 may include highlighted areas or regions 434 showing parts of the column of water having a thermocline layer, e.g., as indicated by the shaded cross-hatching.

FIG. 6 illustrates a diagram of thermal display system 600 in accordance with various implementations described herein.

In reference to FIG. 6, the thermal display system 600 may include at least one transducer 610, a computing device 640, and a network server 690. The transducer 610 may be configured to provide sonar data 612 (e.g., various types of scanning sonar data) corresponding to a position of a watercraft (e.g., vessel, boat, ship, etc.) in a body of water. In some implementations, the transducer 610 may include a spotlight transducer array having multiple scanning transducers. In other implementations, the transducer 610 may include multiple sonar scanning transducer elements, including one or more of a right scanning transducer, a left scanning transducer, a down scanning transducer, and/or a conical down beam transducer.

During operation, the transducer 610 may be configured to use sonar for imaging various environmental features (e.g., fish, plants, rocks, lures, bait, etc.) in a body of water. This imaging may include mapping an underwater environment below a surface of the body of water between the surface and a bottom or floor of the body of water. For instance, this imaging may include various sonar images of fish or schools of fish captured beneath a watercraft by the transducer 610 in any direction.

The transducer 610 may be configured to directly provide the sonar data 612 to the computing device 640. Further, the computing device 640 may be configured to receive the sonar data 612 from the transducer 610 over a wired or wireless network via a network interface 660. As described herein, the sonar data 612 may include data related to thermal characteristics of a body of water (e.g., thermocline related data). Further, as described herein, the sonar data and thermocline data may be associated with chart data including, e.g., chart map data associated with a body of water.

In some implementations, the transducer 610 may be configured to provide various angular ranges of view in multiple directions, such as, e.g., approximately a 90° vertical view along with approximately a 15° to 30° horizontal view. The various angular ranges of view may include or at least be extended to include angular ranges of vertical views from/between 0° to more than 90° along with angular ranges of horizontal views from/between 0° to 180°. In some instances, the transducer 610 may be configured to manually or automatically rotate vertically and/or horizontally so as to rotate the view.

Generally, the term sonar (i.e., SOund Navigation And Ranging) may refer to various techniques for propagating sound underwater to detect objects on or under a surface of a body of water, such as fish, lures, plants, rocks, sea floor, etc. One type of sonar technology refers to active sonar that is configured to emit pulses of sound waves while receiving echoes, which refers to pinging. Sonar may be used to determine acoustic locations and/or measurements of echo characteristics for targets and objects in a body of water. Further, acoustic frequencies used in sonar based devices may vary from low frequency (i.e., infrasonic) to high frequency (i.e., ultrasonic).

In various implementations, the transducer 610 may include one or more sonar traducer elements. Each sonar transducer element (including sonar scanning elements) may be configured to use sonar technology to evaluate attributes of various target objects by interpreting echoes from sound waves. Further, each sonar transducer element may be configured to actively generate low and/or high frequency sound waves and evaluate reflected echoes to thereby measure time intervals between sending signals and receiving corresponding echoes to determine distance to target objects. Each sonar transducer element may be configured to convert energy into sound waves using piezoelectric transducers or capacitive transducers that are configured to convert electrical energy into sound. Each sonar transducer element may be configured to use piezoelectric crystals that include a property of changing size when voltage is applied, whereby applying an alternating current (AC) across the piezoelectric crystals may cause oscillations at high frequencies, to thereby generate high frequency sound waves. In some instances, focusing sound waves generated by each sonar transducer element may be determined by an area and shape of each sonar transducer element, a sound wave frequency of each sonar transducer element, and a sound velocity of the propagation medium, such as a body of water. In some instances, each sonar transducer element may use piezoelectric crystals configured as transceivers to transmit and detect sound waves in one or more elements, such as propagating sound waves and receiving echoing sound waves.

In some implementations, the transducer 610 may be electrically coupled to the computing device 640 via one or more electrical wires or cables (not shown). Further, the computing device 640 may be configured to store/record sonar data received from the transducer 610 via the electrical cables. The computing device 640 may be configured to control operation of a watercraft. In some instances, operation of the watercraft may be controlled by the computing device 640 including user interaction with the computing device 640. In some other instances, operation of the watercraft may be controlled via user interaction with a foot-pedal (not shown) positioned on the watercraft.

In some implementations, the transducer 610 may include one or more sensors (not shown). For instance, the one or more sensors may include a dedicated sensor (e.g., water sensor) configured for sensing deployment and/or removal of the transducer 610 in and/or from the body of water 102. In this instance, the dedicated sensor may include electrode terminals (not shown) configured to activate (e.g., power-up) the transducer 610 when the watercraft is deployed in water. The electrode terminals may be configured to deactivate (e.g., power-down) the transducer 610 when the watercraft is removed or withdrawn from water. Further, in some instances, the one or more sensors may include one or more environmental sensors, such as a temperature sensor.

The computing device 640 may include at least one processor 642 and memory 644 having instructions that cause the processor 642 to display images associated with the sonar data 612 on a display component or device 670. The instructions may cause the processor 642 to simultaneously display multiple images associated with the sonar data 612 and other related data (e.g., chart map data) on the display device 670 in a split screen mode of operation, as described herein. Further, the computing device 640 may be configured to create/generate sonar logs associated with the sonar data 612.

The computing device 640 may include a thermal display module 662 that may be configured to display thermal characteristics of a body of water, such as, e.g., data related to a thermocline layer or region of the body of water. The thermal display module 662 may be configured to display chart data (e.g., chart map data) along with sonar data and/or thermocline data associated with the body of water. In some implementations, the thermocline data may be displayed along with the chart data and/or the sonar data as an overlay. For instance, thermocline data may be displayed as an image that overlays an image of a chart map and/or overlays an image of sonar data. These various images may be displayed on a display (e.g., MFD or other marine electronics device or display) and thus used to provide a view to an angler (e.g., fisherman, boat captain, or other user).

The computing device 640 may be configured to store/record sonar data 612 and/or sonar logs in one or more databases (e.g., database 680). The computing device 640 may be configured to upload the sonar data 612 and/or sonar logs to the network server 690, such as, e.g., a cloud server or other network server, via the network interface 660. The computing device 640 may be configured to store/record multiple sonar logs and create/generate a map therefrom. The computing device 640 and/or network server 690 may be configured to create/generate one or more maps by stitching (e.g., combining or joining) multiple sonar logs together. The computing device 640 may be configured to receive geo-coordinate data 652, such as global positioning system data (i.e., GPS data), via a GPS transceiver 650 and associate the received GPS data to the sonar data 612, sonar logs, and/or maps at any time, including prior to upload. In various instances, the wired or wireless network may include any type of wired or wireless communication network and/or cloud based network.

In various implementations, the computing device 640 may be configured as a special purpose machine for interfacing with one or multiple sonar transducers, such as, e.g., more than one transducer 610. The computing device 640 may configured to display one or more images (including simultaneous display of multiple images) associated with sonar data, thermal data (e.g., thermocline data), and/or chart map data associated with a body of water. Further, the computing device 640 may include standard elements and/or components, including the at least one processor 642, the memory 644 (e.g., non-transitory computer-readable storage medium), at least one database 680, power, peripherals, and various other computing elements and/or components that may not be specifically shown in FIG. 6. The computing device 640 may include the display device 670 (e.g., a monitor or other display) that may be used to provide a user interface (UI) 672, including a graphical user interface (GUI). In FIG. 6, the display 670 is shown as an incorporated part of the computing device 304; however, the display 670 may be implemented as a separate component. Further, the UI 672 may be used to receive one or more preferences from a user of the display device 670 for managing or utilizing the system 600, including interfacing with the transducer 610. As such, a user may setup desired behavior of the computing system 600 and/or transducer 610 via user-selected preferences using the UI 672 associated with the display device 670. Moreover, various elements and/or components of the system 600 that may be useful for the purpose of implementing the thermal display system 600 and components thereof may be added, included, and/or interchanged, in a manner as described herein.

Computing System

Implementations of various technologies described herein may be operational with numerous general purpose or special purpose computing system environments or configurations. Instances of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. The computing systems may be configured to operate using various radio frequency technologies and implementations, such as sonar, radar, GPS, and like technologies.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Marine Electronics Device

FIG. 7 illustrates an instance schematic of a marine electronics device 700 in accordance with various implementations described herein.

The marine electronics device 700 may be referred to as a marine display or multi-function display (MFD) having a screen 705. As shown in reference to FIG. 7, the marine electronics device 700 may be configured to display chart map data, sonar data, and/or thermocline data, as described in reference to FIGS. 1-4.

In some instances, the screen 705 may be sensitive to touching by a human implement, such as, e.g., a finger. In other instances, the screen 705 may be sensitive to body heat from the finger, a stylus, or responsive to a mouse. In various implementations, the marine electronics device 700 may be attached to various buses and/or networks, such as, e.g., a National Marine Electronics Association (NMEA) bus or network. The marine electronics device 700 may send or receive data to or from another device attached to the NMEA 2000 bus. For instance, the marine electronics device 700 may transmit commands and receive data from a motor or a sensor using an NMEA 2000 bus. In some implementations, the marine electronics device 700 may be capable of steering a vessel and controlling the speed of the vessel, i.e., autopilot. For instance, one or more waypoints may be input to the marine electronics device 700, and the marine electronics device 700 may be configured to steer the vessel to the one or more waypoints. Further, the marine electronics device 700 may be configured to transmit and/or receive NMEA 2000 compliant messages, messages in a proprietary format that do not interfere with NMEA 2000 compliant messages or devices, and/or messages in any other format. The marine electronics device 400 may be attached to various other communication buses and/or networks configured to use various other types of protocols that may be accessed via, e.g., NMEA 2000, NMEA 0183, Ethernet, Proprietary wired protocol, etc.

The marine electronics device 700 may be operational with numerous general purpose or special purpose computing system environments and/or configurations. The marine electronics device 700 may include any type of electrical and/or electronics device capable of processing data and information via a computing system. The marine electronics device 700 may include various marine instruments, such that the marine electronics device 700 may use the computing system to display and/or process the one or more types of marine electronics data. The device 700 may display marine electronic data 715, such as, e.g., sonar data and images associated with sonar data. The marine electronic data types 715 may include chart data, radar data, sonar data, steering data, dashboard data, navigation data, fishing data, engine data, and the like. The marine electronics device 700 may include a plurality of buttons 720, which may be include physical buttons or virtual buttons, or a combination thereof. The marine electronics device 700 may receive input through a screen 705 sensitive to touch or buttons 720.

In some implementations, according to various techniques described herein, the marine electronics device 700 may be configured to simultaneously display images associated with multiple transducers, array of transducers, and the like. For instance, the marine electronics device 700 may be configured to simultaneously display images on the screen 705 associated with chart map data, sonar data, and/or thermocline data, as described in reference to FIG. 4. The marine electronics device 700 may be configured to simultaneously display images associated with sonar data and/or thermocline data from multiple points of view on the screen 705, e.g., in a split screen mode of operation, such as, e.g., a left-side display 715A and a right-side display 715B. In some other instances, the marine electronics device 700 may be configured to display images associated with GPS data and/or thermocline depth data in another portion 715C of the screen 715.

The marine electronics device 700 may be configured as a computing system having a central processing unit (CPU), a system memory, a graphics processing unit (GPU), and a system bus that couples various system components including the system memory to the CPU. In various implementations, the computing system may include one or more CPUs, which may include a microprocessor, a microcontroller, a processor, a programmable integrated circuit, or a combination thereof. The CPU may include an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. The GPU may generate graphical user interfaces that present the output data. The GPU may also provide objects, such as menus, in the graphical user interface. A user may provide inputs by interacting with the objects. The GPU may receive the inputs from interaction with the objects and provide the inputs to the CPU. A video adapter may be provided to convert graphical data into signals for a monitor (MFD 700).

The system bus may be any of several types of bus structures, including a memory bus or memory controller, a peripheral bus, and a local bus using any of a variety of bus architectures. By way of instance, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For instance, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of instance, and not limitation, communication media may include wired media such as a wired network or direct-wired connection, and wireless media such as acoustic, radio frequency (RF), infrared (IR), and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs. In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some instances, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for instance, recorded points. The application programs may include various mobile applications ("apps") and other applications configured to perform various methods and techniques described herein. The operating system may be any suitable operating system that may control the operation of a networked personal or server computer.

As described herein, a user may enter commands and information into the computing system through input devices such as the buttons 720, which may be physical buttons, virtual buttons, or combinations thereof. In some implementations, other input devices may be used and may include a microphone, a mouse, or the like (not shown). These and other input devices may be connected to the CPU through a serial port interface coupled to system bus, but may be connected by other interfaces, such as a parallel port, game port or a universal serial bus (USB).

Certain implementations may be configured to be connected to a global positioning system (GPS) receiver system and/or a marine electronics system. The GPS system and/or marine electronics system may be connected via the network interface. The GPS receiver system may be used to determine position data for the vessel on which the marine electronics device 700 is disposed. The GPS receiver system may then transmit the position data to the marine electronics device 700. In other instances, any positioning system known to those skilled in the art may be used to determine and/or provide the position data for the marine electronics device 700.

The marine electronics system may include one or more components disposed at various locations on the vessel. Such components may include one or more data modules, sensors, instrumentation, and/or any other devices known to those skilled in the art that may transmit various types of data to the marine electronics device 700 for processing and/or display. The various types of data transmitted to the marine electronics device 700 from the marine electronics system may include marine electronics data and/or other data types known to those skilled in the art. The marine electronics data received from the marine electronics system may include chart data, sonar data, structure data, radar data, navigation data, position data, heading data, automatic identification system (AIS) data, Doppler data, speed data, course data, or any other type known to those skilled in the art.

The marine electronics system may include a radar sensor for recording the radar data and/or the Doppler data, a compass heading sensor for recording the heading data, and a position sensor for recording the position data. In a further implementation, the marine electronics system may include an AIS transponder for recording the AIS data, a paddlewheel sensor for recording the speed data, and/or the like.

The marine electronics device 700 may receive external data via the LAN or the WAN. In one implementation, the external data may relate to information not available from the marine electronics system. The external data may be retrieved from the Internet or any other source. In various instances, the external data may include one or more of atmospheric temperature, tidal data, weather, moon phase, sunrise, sunset, water levels, historic fishing data, and other fishing data.

In one implementation, the marine electronics device 700 may be a multi-function display (MFD) unit, such that the marine electronics device 700 may be capable of displaying and/or processing multiple types of marine electronics data. FIG. 7 illustrates a schematic diagram of an MFD unit in accordance with implementations of various techniques described herein. In particular, the MFD unit may include the computing system, the monitor (MFD 700), the screen 705, and the buttons such that they may be integrated into a single console.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, instances of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For instance, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. Further, the terms "includes," "including," "comprises," and/or "comprising," when used in this specification, may specify a presence of stated features, integers, steps, operations, elements, and/or components, but these terms should not be considered to preclude the presence or addition of one or more other features, integers, steps, operations, elements, components and/or groups thereof.

As used herein, depending on the context, the term "if" may be construed to mean "when" or "upon" or "in response to determining" or "in response to detecting." Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as instance forms of implementing the claims.

What is claimed is:

1. A device, comprising:
a marine based multifunction display configured to interface with a global positioning system (GPS) sensor and one or more sonar sensors;
the marine based multifunction display comprising:
 a display; and
 a computer configured to:
  receive, from the global positioning system (GPS) sensor, positional data comprising GPS data;
  receive, from the one or more sonar sensors, sonar scanning data;
  determine thermocline data based on the sonar scanning data, wherein determining the thermocline data comprises determining a depth range corresponding to a thermocline region associated with a body of water as identified in the sonar scanning data; and
  display a first image comprising a chart map of the body of water that identifies areas of the body of water having a thermocline layer based on the positional data and the thermocline data.

2. The device of claim 1, wherein the computer is further configured to:
display the first image on a first portion of the display; and
display a second image associated with the sonar scanning data that identifies underwater features below a surface of the body of water along with identifying a vertical depth of the thermocline layer based on the thermocline data, wherein the second image is displayed on a second portion of the display different than the first portion;

wherein the computer is configured to simultaneously display the first and second images on a split screen of the display.

3. The device of claim 2, wherein the computer is configured to automatically identify the underwater features below the surface of the body of water based on the sonar scanning data, automatically identify the vertical depth of the thermocline layer based on the thermocline data, and automatically display the second image on the display based on the sonar scanning data and the thermocline data.

4. The device of claim 2, wherein the second image comprises a sonar image having a shaded region that overlays a portion of the sonar image identified as the thermocline layer.

5. The device of claim 2, wherein the second image comprises a sonar image having a vertical depth scale displayed along with the sonar image, and wherein the vertical depth scale provides information related to a depth of the thermocline layer.

6. The device of claim 5, wherein the information related to the depth of the thermocline layer comprises an indication for an upper boundary depth of the thermocline layer and another indication for a lower boundary depth of the thermocline layer.

7. The device of claim 1, wherein the computer is configured to automatically identify the areas of the body of water having the thermocline layer based on the positional data and the thermocline data and automatically display the first image on the display based on the positional data and the thermocline data.

8. The device of claim 1, wherein the first image identifies a position of the device on the body of water based on the positional data along with identifying the areas of the body of water having the thermocline layer.

9. The device of claim 1, wherein the one or more sonar sensors are configured to detect the thermocline layer in the body of water, and wherein the sonar data comprises the thermocline data received from the one or more sonar sensors, and wherein the one or more sonar sensors comprise multiple transducer elements having one or more of a right scanning transducer, a left scanning transducer, a down scanning transducer, and a conical down beam transducer.

10. The device of claim 1, wherein the first image includes one or more highlights to the identified areas having a thermocline layer.

11. A multi-function marine based apparatus, comprising:
a communication interface configured to interface with a global positioning system (GPS) sensor and one or more sonar sensors;
a display;
a processor; and
memory having instructions that cause the processor to:
receive, from the global positioning system (GPS) sensor, positional comprising GPS data;
receive, from the one or more sonar sensors, sonar scanning data;
determine thermocline data based on the sonar scanning data, wherein determining the thermocline data comprises determining a depth range corresponding to a thermocline region associated with a body of water as identified in the sonar scanning data,
on a first portion of the display, display a first image comprising a chart map of the body of water that identifies areas of the body of water having a thermocline layer based on the positional data and the thermocline data, and
on a second portion of the display different than the first portion, display a second image associated with the sonar scanning data that identifies underwater features below a surface of the body of water along with identifying a vertical depth of the thermocline layer based on the thermocline data.

12. The apparatus of claim 11, wherein the memory includes instructions configured to automatically identify the areas of the body of water having the thermocline layer based on the positional data and the thermocline data and automatically display the first image on the display based on the positional data and the thermocline data.

13. The apparatus of claim 11, wherein the memory includes instructions configured to automatically identify the underwater features below the surface of the body of water based on the sonar data, automatically identify the vertical depth of the thermocline layer based on the thermocline data, and automatically display the second image on the display based on the sonar data and the thermocline data.

14. The apparatus of claim 11, wherein the one or more sonar sensors are configured to detect the thermocline layer in the body of water, and wherein the sonar scanning data comprises the thermocline data received from the one or more sonar sensors.

15. The apparatus of claim 11, wherein the first image includes one or more highlights to the identified areas having a thermocline layer.

16. A method, comprising:
receiving, at a marine based multi-function display (MFD) configured to interface with a global positioning system (GPS) sensor and one or more sonar sensors, positional data comprising GPS data, wherein the positional data is received from the global positioning system (GPS) sensor;
receive, at the MFD, sonar scanning data, wherein the sonar scanning data is received from the one or more sonar sensors;
determine thermocline data based on the sonar scanning data, wherein determining the thermocline data comprises determining a depth range corresponding to a thermocline region associated with a body of water as identified in the sonar scanning data;
on a first portion of a marine electronics device, displaying a first image comprising a chart map of the body of water that identifies areas of the body of water having a thermocline layer based on the positional data and the thermocline data; and
on a second portion of the marine electronics device that is different than the first portion, displaying a second image associated with the sonar scanning data that identifies underwater features below a surface of the body of water along with identifying a vertical depth of the thermocline layer based on the thermocline data.

17. The method of claim 16, further comprising:
automatically identifying the areas of the body of water having the thermocline layer based on the positional data and the thermocline data; and
automatically displaying the first image on the display based on the positional data and the thermocline data.

18. The method of claim 16, further comprising:
automatically identifying the underwater features below the surface of the body of water based on the sonar scanning data;
automatically identifying the vertical depth of the thermocline layer based on the thermocline data; and automatically displaying the second image on the display based on the sonar scanning data and the thermocline data.

19. The method of claim 16, wherein the first image includes one or more highlights to the identified areas having a thermocline layer.

20. A method, the method comprising:
receiving, at a marine based multi-function display (MFD) configured to interface with one or more sonar transducers, sonar scanning data, wherein the sonar scanning data is received from the one or more sonar transducers;
display a chart map associated with a body of water;
receive a request to activate a thermocline overlay associated with the chart map;
determine a thermocline region associated with the body of water from sonar scanning data received from the one or more sonar transducers, wherein determining the thermocline region comprises determining a depth range corresponding to the thermocline region associated with the body of water as identified from the sonar scanning data; and
determine areas on the chart map associated with the body of water corresponding to the thermocline region; and
cause display of one or more highlights to the determined areas on the chart map corresponding to the thermocline region.

* * * * *